P. SMITH & F. W. PERRY.
Chucks for Holding Screw-Caps.

No. 157,726. Patented Dec. 15, 1874.

Witnesses
L. F. Brous.
As. P. Grant.

Inventors:
Philip Smith.
Frank W. Perry.
by John A. Wiedersheim
Atty.

UNITED STATES PATENT OFFICE.

PHILIP SMITH, OF NEW BRUNSWICK, AND FRANK W. PERRY, OF CAMDEN, ASSIGNORS TO JOHN L. MASON, OF NEW BRUNSWICK, NEW JERSEY.

IMPROVEMENT IN CHUCKS FOR HOLDING SCREW-CAPS.

Specification forming part of Letters Patent No. 157,726, dated December 15, 1874; application filed July 27, 1874.

*To all whom it may concern:*

Be it known that we, PHILIP SMITH, of New Brunswick, in the county of Middlesex, and FRANK W. PERRY, of the city and county of Camden, both in the State of New Jersey, have invented a new and useful Improvement in Holders or Chucks for Screw-Caps; and we do hereby declare the following to be a clear and exact description of the nature thereof, sufficient to enable others skilled in the art to which our invention appertains to fully understand, make, and use the same, reference being had to the accompanying drawings making a part of this specification, in which—

Figure 1:
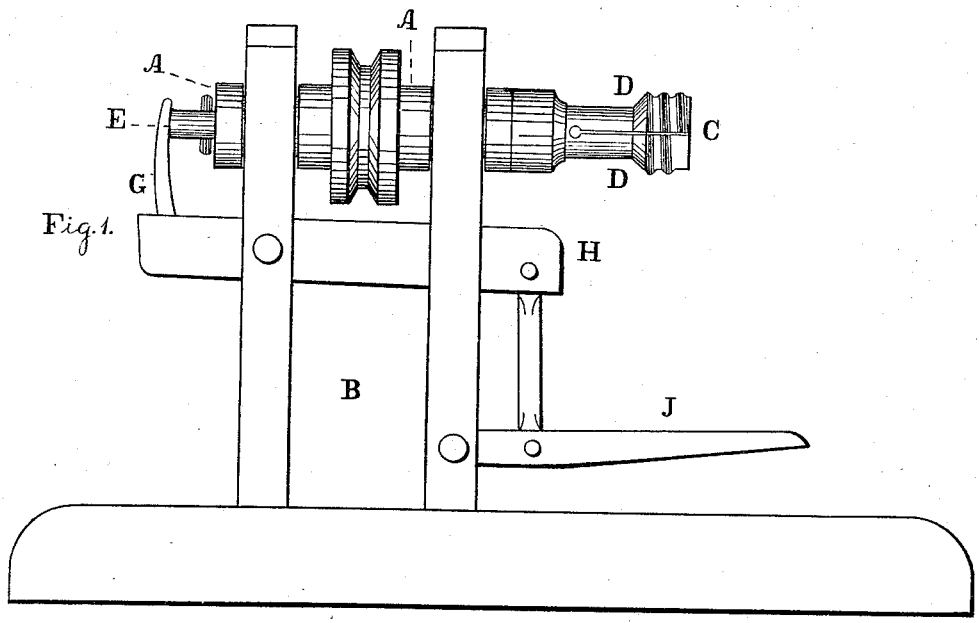
Figure 2:
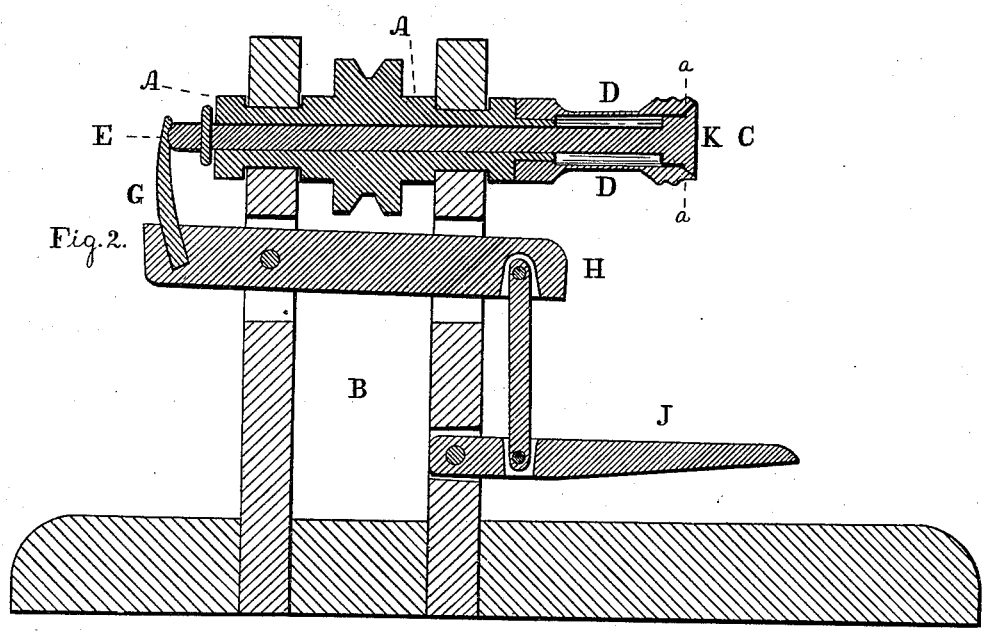
Figure 3:

Figure 1 is a side view of the device embodying our invention. Fig. 2 is a central longitudinal vertical section thereof. Fig. 3 is a side view of a portion of a modification.

Similar letters of reference indicate corresponding parts in the several figures.

This invention relates to a chuck for holding screw-caps while being polished, milled, scored, or otherwise acted on; and consists in adapting the chuck to expand in order to hold the cap, and contract when the same is to be released.

Referring to the drawings, A represents a mandrel or shaft, which is mounted on suitable frame-work B and receives power of rotation in any suitable manner. To one end of the mandrel there is secured the head or chuck C, which is split, divided, or otherwise constructed to form a series of expansible jaws, D D, and rotates with said mandrel A. The chuck C is of diameter slightly smaller than that of the metal screw-cap to be operated upon, and the external face of said chuck is screw-threaded to correspond with the thread of said cap, and said thread may be sectional on the various jaws or continuous on each jaw. The chuck is hollow, and its inner face is conical, or partially conical, as will be seen at $a$, Fig. 2. Through the mandrel A is passed a shaft, E, to one end of which is connected or fitted an arm, G, of a lever, H, which is properly mounted on the frame B and operated by means of a foot or other lever, J. The other end of the shaft D has formed with or secured to it a button, K, having a conical head whose diameter is greater than the inner diameter of the chuck C at the conical portion $a$ thereof.

The operation is as follows: Power is applied to the mandrel A, and the cap to be acted upon brought up to the chuck C. The thread of the cap engages with the thread of the chuck, and thus the cap is screwed on the chuck. As the cap advances on the chuck the pressure of the former forces the button into the chuck or head, and the conical face of the button, bearing against the conical face of the interior of the chuck, expands the jaws D of the chuck. The chuck is thus pressed firmly against the cap, whereby the latter will be properly held while being subjected to the necessary operations of polishing, scouring, &c. In order to remove the cap the lever J is depressed so that the shaft E, guided in the mandrel A, is forced forward in the direction toward the chuck C. This causes the button K to move sufficiently from the chuck to permit the jaws to contract, and, the button pressing against the cap, the latter flies free of the chuck, which, being thus clear of the cap, is in condition for application of a fresh cap.

The mechanism for moving the lever G may be connected to suitable machinery and gaged therewith, so as to automatically operate said shaft at the proper moment, when the cap has received its operation and is to be removed.

Having thus described our invention, what we claim as new, and desire to secure by Letters Patent, is—

1. The hollow and rotary mandrel A, in combination with the expansible threaded jaws D, having their inner faces conical, and the button K, having a conical face, all constructed and operating, substantially as and for the purpose set forth.

2. The expansible jaws D, with external threads, the hollow and rotary mandrel A carrying said jaws, and the end button K, with operating-shaft E passing through the rotary mandrel, all combined and operating substantially as set forth.

PHILIP SMITH.
F. W. PERRY.

Witnesses:
JOHN A. WIEDERSHEIM,
A. P. GRANT.